United States Patent [19]
Maitani

[11] 4,190,335
[45] Feb. 26, 1980

[54] SHUTTER CONTROLLING AID MEANS FOR USE WITH CAMERA

[75] Inventor: Yoshihisa Maitani, Hachioji, Japan

[73] Assignee: Olympus Optical Company, Ltd., Tokyo, Japan

[21] Appl. No.: 841,948

[22] Filed: Oct. 13, 1977

[30] Foreign Application Priority Data

Oct. 16, 1976 [JP] Japan .................. 51-24154

[51] Int. Cl.² .............................................. G03B 15/05
[52] U.S. Cl. .................................. 354/34; 354/145
[58] Field of Search ..................... 354/27, 32–35, 354/50, 51, 60 R, 60 F, 137, 139, 145, 147, 149, 133

[56] References Cited

U.S. PATENT DOCUMENTS

| | | | |
|---|---|---|---|
| 3,673,415 | 6/1972 | Yoshimura et al. | 354/51 |
| 3,720,144 | 3/1973 | Uchiyama et al. | 354/34 |
| 3,987,468 | 10/1976 | Matsuzaki et al. | 354/145 |
| 4,016,575 | 4/1977 | Uchiyama et al. | 354/33 |
| 4,030,108 | 6/1977 | Yazaki et al. | 354/27 |

FOREIGN PATENT DOCUMENTS 47-40329 10/1972 Japan ............................. 354/33

Primary Examiner—L. T. Hix
Assistant Examiner—William B. Perkey
Attorney, Agent, or Firm—Lerner, David, Littenberg & Samuel

[57] ABSTRACT

A means is provided for use with a camera of the type having an electrical shutter and which is adapted to utilize a strobo unit. The said means comprises a first circuit including a capacitor and a resistor connected in series across the X contacts of said camera and a second circuit connected with said first circuit and producing a shutter closing signal. The capacitor is charged by power means in the strobo unit. The X contacts close to cause the strobo unit flash means to operate and, at the same time, discharging said first circuit means and triggering the second circuit means to produce a shutter closing signal for closing the shutter at that time unless the shutter has already been closed. Additional circuit means may be provided between said first and second means for delaying operation of said second circuit means.

10 Claims, 2 Drawing Figures

1

SHUTTER CONTROLLING AID MEANS FOR USE WITH CAMERA

BACKGROUND OF THE INVENTION

The invention relates to a shutter controlling aid means for use with a camera which incorporates an electrical shutter and which is adapted to utilize an ordinary (not auto) strobo unit.

A camera incorporating an electrical shutter such as the one of direct photometry type, for example, in which a photometric circuit is also responsive to an illumination from an ordinary strobo unit to operate the shutter circuit, operates to close the shutter in a daytime synchronized photographing operation when the sum of natural light and illumination from the ordinary strobo unit reaches a given level. It is also operative to close the shutter when a given amount of exposure is reached in response to either natural light or illumination from an ordinary strobo unit alone.

Where the exposure provided by natural light is small and it is necessary to use an ordinary strobo unit to take a picture, it is necessary to determine if the exposure provided by the ordinary strobo unit is sufficient for a preselected diaphragm aperture and a given distance to an object being photographed. Where the illumination from the ordinary strobo unit is insufficient, the shutter remains open after the termination of the illumination from the ordinary strobo unit, and the shutter will be closed only when the deficit is compensated for by natural light. If the magnitude of the deficit is very small, the shutter will be closed by a short interval after the termination of the illumination from the strobo unit, presenting no substantial problem. However, when an incorrect selection is made such that the illumination provided by the ordinary strobo unit is only one-half the level required, the remaining half must be supplied by natural light of low brightness, resulting in a prolonged shutter open period. When the camera is held by hand, any movement caused may result in a doubled photographing. Also, the shutter will be maintained in an open condition even if the deficit is small when the contribution of natural light is small for a preselected diaphragm aperture, preventing the camera from being prepared to perform the next photographing operation. When the shutter continues to be open for a period on the order of ten or twenty seconds, there will be a great influence psychologically on the user. In view of these considerations, it will be desirable to detect the illumination from a strobo unit to cause a forced closure of the shutter when taking a flash photograph using an ordinary strobo unit in order to improve the yield of the resulting photographs and to remove the feeling of restlessness even though some photographs may be under-exposed to a degree.

SUMMARY OF THE INVENTION

It is an object of the invention to provide a shutter controlling aid means for use with a camera having an electrical shutter which is constructed to produce a shutter closing signal at the termination of or a given time length after the termination of a flash illumination from an ordinary strobo unit which is operated by the closure of the X contacts of the camera, thereby assuring the closure of the shutter.

In accordance with the invention, the shutter controlling aid means for use with a camera having an electrical shutter and adapted to utilize an ordinary strobo unit comprises a first circuit including a capacitor and a resistor connected in series with the X contacts in the camera, and a second circuit connected with the first circuit for producing a shutter closing signal. When the strobo unit flashes in response to closure of the X contacts, the capacitor of said first circuit, which was charged by the power source of the strobo unit prior to closure of the X contacts, discharges to cause the second circuit to produce a shutter closing signal for closing the shutter unless it is previously closed. In this manner, the inconveniences which result from the shutter being maintained open for a prolonged period of time are avoided.

DESCRIPTION OF PREFERRED EMBODIMENTS

Figure 1:
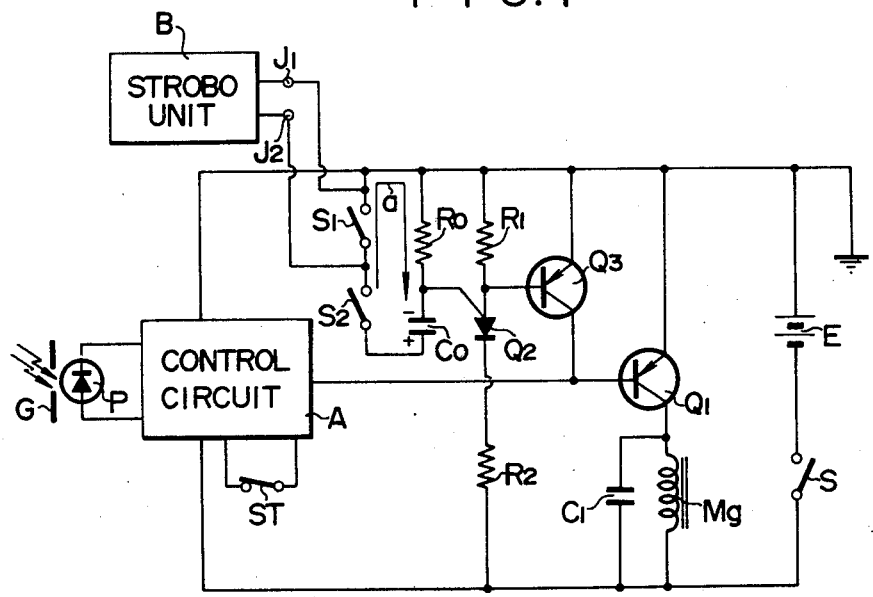
FIGS. 1 and 2 are circuit diagrams of preferred embodiments of the shutter controlling aid means according to the invention which is used with a camera having an electrical shutter and utilizing an ordinary strobo unit.
Figure 2:
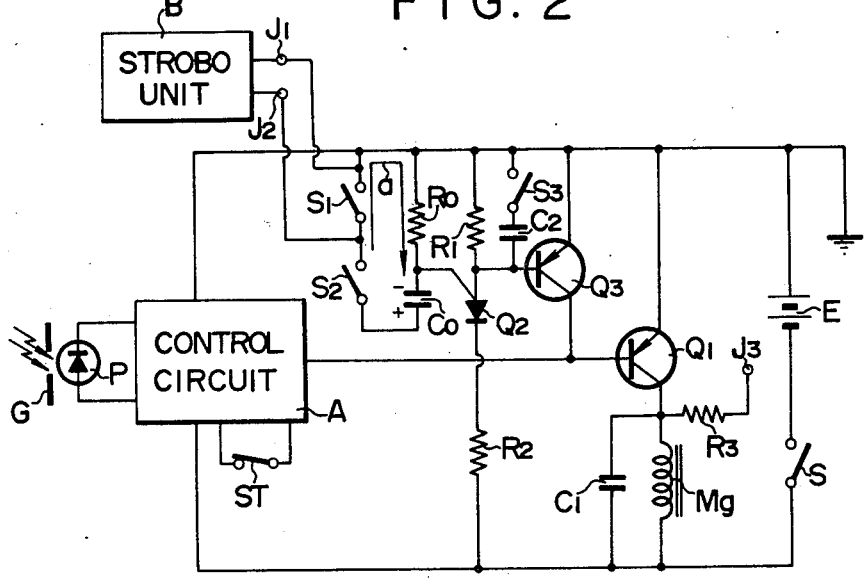

Referring to FIGS. 1 and 2, the application of the invention to a camera having an electrical shutter and adapted to be utilized with a strobo unit, as will be described hereinbelow. FIG. 1 shows one embodiment of the invention. In this Figure, a control circuit A for driving an electrical shutter as well as a series circuit including a switching transistor Q1 and a shutter closing electromagnet Mg are connected in parallel across the series combination of a power source E and a main switch S. The control circuit A may comprise any one of well the known circuits including a time constant circuit, and is constructed such that when a trigger switch ST is opened upon shutter release, the time constant circuit operates on the amount of reflected light from an object being photographed, which impinges upon a photoelectric transducer element P through a diaphragm G, and applies a control signal to the switching transistor Q1 when a given decision level is reached. It is to be understood that the control circuit A also contains a time constant circuit designed for manual operation.

The transistor Q1 comprises a PNP transistor having its base connected to be supplied with the control signal derived from the control circuit A. The emitter of this transistor is connected with the grounded positive terminal of the power source E while the collector is connected with one end of the electromagnet Mg, which is shunted by a capacitor C1 for absorbing any back e.m.f. The switch S is closed upon shutter release, and as the first blind runs to open the exposure light path, the transistor Q1 is rendered conductive to energize the electromagnet Mg for constraining the second blind of the shutter from running. When the control signal from the control circuit A is applied to its base, Q1 is turned off to deenergize the electromagnet Mg, thus allowing a running of the second blind.

In accordance with the invention, a delay circuit is connected across the X contacts in the camera associated with the ordinary strobo unit, and there is provided a circuit for producing a shutter closing signal which causes the deenergization of the electromagnet Mg, when it is operated by the delay circuit. The delay circuit comprises a series circuit including a capacitor Co and resistor Ro connected in series with an operating switch S2 across a switch S1 which represents the X contacts. The circuit for producing a shutter closing signal comprises a switching element in the form of a programmable unijunction transistor (PUT) Q2, and resistors R1 and R2. The X contacts switch S1 is closed when the shutter is fully open, and has its stationary contact connected with ground reference formed by the camera body and has its movable contact connected with a stationary contact of the switch S2. The movable contact of the switch S2 is connected with one terminal of the capacitor Co, the other terminal of which is connected with one terminal of resistor Ro, which has its other terminal in turn connected with the ground. The junction between the resistor Ro and capacitor Co is connected with the gate of PUT Q2, the anode of which is connected through resistor R1 with the ground or the camera body and the cathode of which is connected with the negative terminal of the power source E through resistor R2 and switch S.

Figure 3:
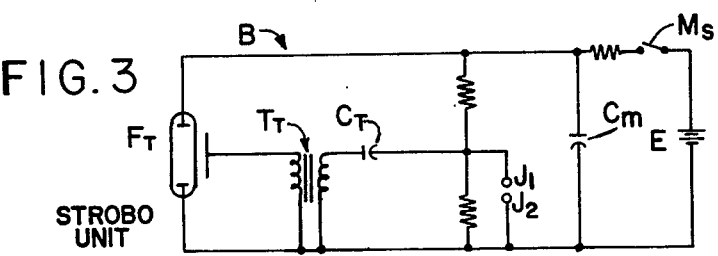
FIG. 3 shows a detailed schematic view of a conventional strobo unit as employed in the preferred embodiment of FIGS. 1 and 2.

The X contacts of switch S1 are connected with terminals J1, J2, which are in turn connected with a trigger circuit of an ordinary strobo unit B (see FIG. 3). As is well recognized, a strobo unit is constructed such that when a main switch MS thereof is closed, a main capacitor Cm and a trigger capacitor $C_t$ are both charged, and when the X contacts S1 are closed by the opening of the shutter, the charge on the trigger capacitor activates a trigger transformer $T_t$ which in turn triggers a trigger electrode of a flash tube FT to cause illumination thereof. The X contacts S1 may be connected across the trigger capacitor $C_t$, for example.

In the present example, the circuit for producing a shutter closing signal comprises a PNP transistor Q3. The transistor Q3 has its base connected with the anode of PUT Q2, its collector connected with the base of the transistor Q1 and its emitter connected with the emitter of the transistor Q1. In operation, the ordinary strobo unit B is mounted on the camera, and its main switch is closed as is the switch S2 which operates the first circuit comprised of capacitor Co and resistor Ro. Then the main capacitor and the trigger capacitor within the strobo unit B are charged. Simultaneously, the voltage of the trigger circuit is applied to the capacitor Co, which is charged to the polarity shown by the plus and minus signs. Upon shutter release, the main switch S is closed, and the transistor Q1 is turned on to energize the electromagnet Mg, thus constraining the second blind of the shutter from running. Also, the trigger switch ST is opened to activate the control circuit A. As the first blind runs to open an exposure light path, the X contacts S1 are closed to operate the ordinary strobo unit B, which therefore produces an illumination in synchronized relationship with the shutter running. In this manner, a synchronized flash photographing operation is performed. The closure of the X contacts S1 causes a current flow in a direction indicated by an arrow a by discharge of the capacitor Co through the switch S2, X contacts S1 and resistor Ro. The discharge of capacitor Co causes PUT Q2 to fire. The conduction of PUT Q2 causes an operating voltage to be applied to the base of transistor Q3, which also conducts. The conduction of the transistor Q3 provides a short-circuit path across the emitter and base of the switching transistor Q1, which is therefore turned off. The short-circuiting by the transistor Q3 represents a shutter closing signal to the electromagnet Mg. Thereupon, the second blind of the shutter which has been constrained becomes free to run, thus closing the exposure light path and terminating a photographing operation. It is to be noted that the delay circuit has a time constant which is equal to or greater than the flash illumination time interval of the strobo unit.

When the ordinary strobo unit B is not mounted or when the switch S2 is not closed, the capacitor Co cannot be charged, and hence the delay circuit cannot operate, so that the transistor Q1 is controlled by an output from the control circuit A.

FIG. 2 shows a circuit diagram of a modification of the arrangement shown in FIG. 1. Specifically, this embodiment is constructed to provide a time delay in producing the shutter closing signal so that any slight under-exposure which results when the transistor Q3 is immediately turned on at the termination of the illumination may be made up for by natural light to provide a proper exposure. This additional delay is achieved by connecting a capacitor C2 across the base and emitter of the transistor Q3 through another switch S3.

Another modification found in the arrangement of FIG. 2 is the provision of a terminal J3 connected through a resistor R3 with the collector of the switching transistor Q1 for applying an illumination stop signal to the control terminal of the thyristor employed in the conventional bypass circuit of the ordinary strobo unit B. This permits the illumination of the ordinary strobo unit B. This permits the illumination of the ordinary strobo unit B to be interrupted by the stop signal whenever it continues for a period more than sufficient to close the shutter. The illumination stop signal is produced as a result of the transistor Q1 being turned off at an earlier point in time by the control circuit A where the illumination from the ordinary strobo unit B is excessive. When the stop signal is applied to the ordinary strobo unit B, it terminates the illumination, and simultaneously the electromagnet Mg is deenergized to allow the shutter to close. The stop signal cannot be produced at the termination of the illumination from the ordinary strobo unit B where the illumination supplied by the strobo unit B is insufficient. In this instance, the delay circuit becomes effective to turn on the transistor Q3, which renders the transistor Q1 non-conductive to close the shutter. Thereupon, the illumination stop signal is produced, whcih however has no effect since the illumination of the ordinary strobo unit B is already terminated.

What is claimed is:
1. In combination:
a strobo unit;
an electrical shutter circuit and X contacts for operating said strobo unit, said X contacts being adapted to close during initiation of a photographing operation, said electrical shutter circuit including terminating means for terminating said photographing operation;
said strobo unit including flash means and power means for powering said flash means;
means for releasably electrically connecting said strobo unit to said electrical shutter circuit;
said flash means being illuminated responsive to closing of said X contacts;
said electrical shutter circuit being comprised of resistor-capacitor storing means being connected across said X contacts and charged by said strobo unit power means when said strobo unit is coupled with said electrical shutter circuit and said X contacts are open and being discharged upon closure of said X contacts to produce a closing signal indicating closure of said X contacts; and said terminating means being responsive to said closing signal for terminating the photographing operation.

2. The shutter controlling means of claim 1 in which said resistor-capacitor storing means is comprised of a capacitor connected to said X contacts, said capacitor being charged by said strobo unit power means when the strobo unit is coupled to said electrical shutter circuit and said X contacts are open and being discharged when said X contacts are closed.

3. The shutter controlling means of claim 2 further comprising second switching means rendered conductive by the discharging of said capacitor upon closing of said X contacts for producing the aforesaid signal and for applying said signal to said terminating means.

4. The shutter controlling means of claim 1 further including second circuit means coupled between said resistor-capacitor storing means and said terminating means for delaying termination of said photographing operation.

5. The shutter controlling means of claim 1 further comprising first switch means coupled between said X contacts and said resistor-capacitor storing means for connecting said X contacts and said resistor-capacitor storing means when closed and for disconnecting said X contacts from said resistor-capacitor storing means when open.

6. The shutter controlling means of claim 4 further comprising switch means coupled to said second circuit means for permitting operation of said second circuit means when closed and for preventing operation of said second circuit means when open.

7. In combination:

a strobo unit;

an electrical shutter circuit including X contacts for coupling with said strobo unit, said electrical shutter circuit having a light measuring circuit for measuring reflected light from the object being photographed to produce a first type of closing signal for terminating a photographing operation;

means for terminating the photographing operation responsive to said first type of closing signal from said light measuring circuit when a predetermined threshold level of light is detected;

said strobo unit including power means and flash means being illuminated by said power means responsive to closing of said X contacts when said strobo unit is coupled with said electrical shutter circuit;

said electrical shutter circuit further including a first resistor-capacitor circuit connected across said X contacts and including a capacitor being charged by said power means when said strobo unit is connected to said electrical shutter circuit and said X contacts are open and being discharged when said X contacts are closed; and second closing signal generating means responsive to discharge of said first resistor-capacitor circuit for producing a second type of closing signal which is applied to said terminating means whereby the second type of closing signal terminates the photographing operation if it is still being performed after illumination of the flash means is terminated.

8. The apparatus of claim 7 wherein said electrical shutter circuit further comprises a solid-state switching means for coupling a signal closing terminating;

second circuit means coupled between said first resistor-capacitor circuit means and closing terminating for delaying the operation of terminating means closing.

9. The apparatus of claim 7 further comprising switch means connected with said first circuit means and having a first position for disconnecting said first resistor-capacitor circuit from said X contacts and a second position for connecting said first resistor-capacitor storing circuit with said X contacts.

10. The apparatus of claim 8 further comprising switch means connected with said second circuit means for coupling said second circuit means to delay the operation of said terminating means when said switch means is in the closed position and to prevent said second circuit means from delaying operation of said terminating means when said switch means is in the open position.

* * * * *

UNITED STATES PATENT AND TRADEMARK OFFICE
CERTIFICATE OF CORRECTION

PATENT NO. : 4,190,335
DATED : February 26, 1980
INVENTOR(S) : Yoshihisa Maitani It is certified that error appears in the above—identified patent and that said Letters Patent are hereby corrected as shown below:

Column 1, line 32, delete --by--;

Column 3, line 60, change "a" to --$\underline{a}$--.

Signed and Sealed this

Twenty-fifth Day of November 1980

[SEAL]

Attest:

SIDNEY A. DIAMOND

Attesting Officer     Commissioner of Patents and Trademarks